(12) United States Patent
Gheyri

(10) Patent No.: US 8,556,689 B2
(45) Date of Patent: Oct. 15, 2013

(54) BUILDING HEATING AND COOLING SYSTEM

(76) Inventor: Cyrous Gheyri, San Jose, CA (US)

(*) Notice: Subject to any disclaimer, the term of this patent is extended or adjusted under 35 U.S.C. 154(b) by 280 days.

(21) Appl. No.: 13/088,310

(22) Filed: Apr. 15, 2011

(65) Prior Publication Data

US 2011/0259559 A1 Oct. 27, 2011

(51) Int. Cl.
*F24F 1/00* (2011.01)
*F24F 7/06* (2006.01)

(52) U.S. Cl.
USPC .......................................... 454/236; 454/244

(58) Field of Classification Search
USPC .................... 454/236, 244, 233, 184
See application file for complete search history.

(56) References Cited

U.S. PATENT DOCUMENTS

| | | | | | |
|---|---|---|---|---|---|
| 4,776,385 | A | * | 10/1988 | Dean | 165/248 |
| 5,573,661 | A | * | 11/1996 | Rachak | 210/170.01 |
| 6,974,382 | B1 | * | 12/2005 | Swan | 454/233 |
| 6,997,207 | B2 | * | 2/2006 | McKesson | 137/312 |
| 8,047,905 | B2 | * | 11/2011 | Everett et al. | 454/187 |
| 2008/0182503 | A1 | * | 7/2008 | Yurcak | 454/270 |

FOREIGN PATENT DOCUMENTS

| | | | |
|---|---|---|---|
| JP | 02017344 A | * | 1/1990 |
| JP | 03152321 A | * | 6/1991 |

OTHER PUBLICATIONS

English translation of te Abstract JP03152321A.*
Englesh translation of the Abstract JP02017344A.*

* cited by examiner

*Primary Examiner* — Steven B McAllister
*Assistant Examiner* — Helena Kosanovic
(74) *Attorney, Agent, or Firm* — David R. Heckadon; Gordon & Rees LLP

(57) ABSTRACT

A system for heating and cooling a main floor of a building, including:
  a building having an attic, a main floor and a crawl space;
  an attic air blower system for moving attic air into the main floor; and
  a crawl space air blower system for moving crawl space air to the main floor, wherein
    (i) the attic air blower moves air from the attic into the main floor when the crawl space air blower moves air from the main floor through the crawl space to the exterior of the building; and,
    (ii) the attic air blower moves air from the main floor through the attic to the exterior of the building when the crawl space air blower moves air from the crawl space into the main floor.

13 Claims, 5 Drawing Sheets

BUILDING HEATING AND COOLING SYSTEM

TECHNICAL FIELD

The present invention relates to systems for heating and cooling buildings, and to building heating and cooling systems that reduce energy usage.

SUMMARY OF THE INVENTION

The present invention provides a system for heating and cooling a floors of a building, including: a building having an attic, a main floor and a crawl space (or basement); an attic air blower system for moving attic air into the main floor; and a crawl space air blower system for moving crawl space air to the main floor, wherein (i) the attic air blower moves air from the attic into the main floor when the crawl space air blower moves air from the main floor through the crawl space to the exterior of the building; and, (ii) the attic air blower moves air from the main floor through the attic to the exterior of the building when the crawl space air blower moves air from the crawl space into the main floor.

Hot air rises. Therefore, in a building attic air is warmer than the air on a main floor, and crawl space air is cooler than the air on the main floor. Simply put, the present invention heats the main floor of a building by moving (hotter) attic air down into the main floor. Conversely, the present invention cools the main floor of a building by moving (cooler) crawl space air up into the main floor.

Preferably, the present invention has: (i) an upper (attic) blower system that either blows air down from the attic to the main floor or sucks air up from the main floor through the attic to the exterior of the building; and (ii) a lower (crawl space) blower system that either blows up from the crawl space to the main floor or sucks air down from the main floor through the crawl space to the exterior of the building. The attic and crawl space blowers are preferably operated at the same time such that: (i) heated air is blown down through a vent in the ceiling from the attic at the same time that cool main floor air is sucked out through a vent in the floor; or (ii) cooled air is blow up through a vent in the floor from the crawl space at the same time that hot main floor air is sucked out through a vent in the ceiling.

DETAILED DESCRIPTION OF THE DRAWINGS

Figure 1:
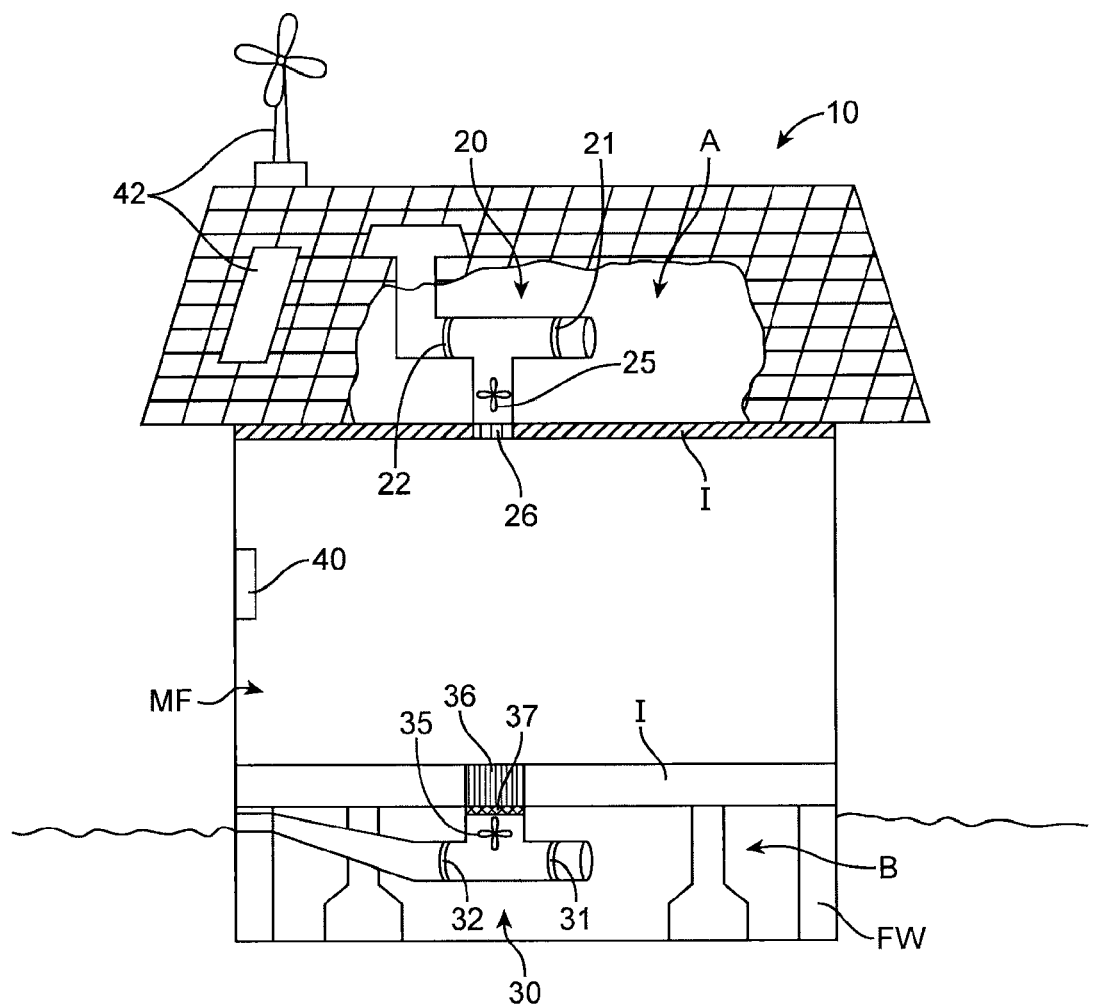
FIG. 1 is a schematic of the present invention.

Referring first to FIG. 1, the present invention provides a building heating and cooling system 10 that is used to regulate the temperature on a main floor MF of a building. The building has an attic A, a main floor MF and a crawl space B. As used herein, the term "crawl space" can equally refer to a full height vertical size crawl space or to a shortened height crawl space. Thus, reference to a "crawl space" in the claims is understood to encompass a crawl space or basement, or any lower level of a building below the main floor.

System 10 comprises an attic air blower system 20 for moving attic air into the main floor; and a crawl space air blower system 30 for moving crawl space air to the main floor.

Attic air blower system 20 comprises: a one-way air vent 21 to pass air from attic A into main floor MF, and a one-way air vent 22 to pass air from main floor MF through to the exterior of the building. As can also be seen, system 20 also comprises a reversible blower (fan 25) for moving air in either direction between the attic and the main floor. System 20 also comprises an air passageway (vent 26) in the ceiling of the main floor.

Crawl space air blower system 30 comprises: a one-way air vent 31 to pass air from crawl space B into main floor MF, and a one-way air vent 32 to pass air from main floor MF through the crawl space to the exterior of the building. As can also be seen, system 30 also comprises a reversible blower (fan 35) for moving air in either direction between crawl space B and main floor MF. System 30 also comprises an air passageway (vent 36) in the floor of the main floor. Preferably, a filter 37 is positioned between vent 36 and fan 34 (to filter the crawl space air prior to it entering the main floor MF).

Preferably, insulation I is also found between attic A and main floor MF and between main floor MF and crawl space B. The building's foundation walls FW are also shown.

A control system 40 is also provided. Control system 40 controls the operation of fans 25 and 35 (controlling when they are turned on and off and which direction they rotate). Control system 40 also senses the temperature on main floor MF. Optionally, control system 40 (and even fans 25 and 35) may be powered by solar panels (or wind turbine) 42.

Figure 2:
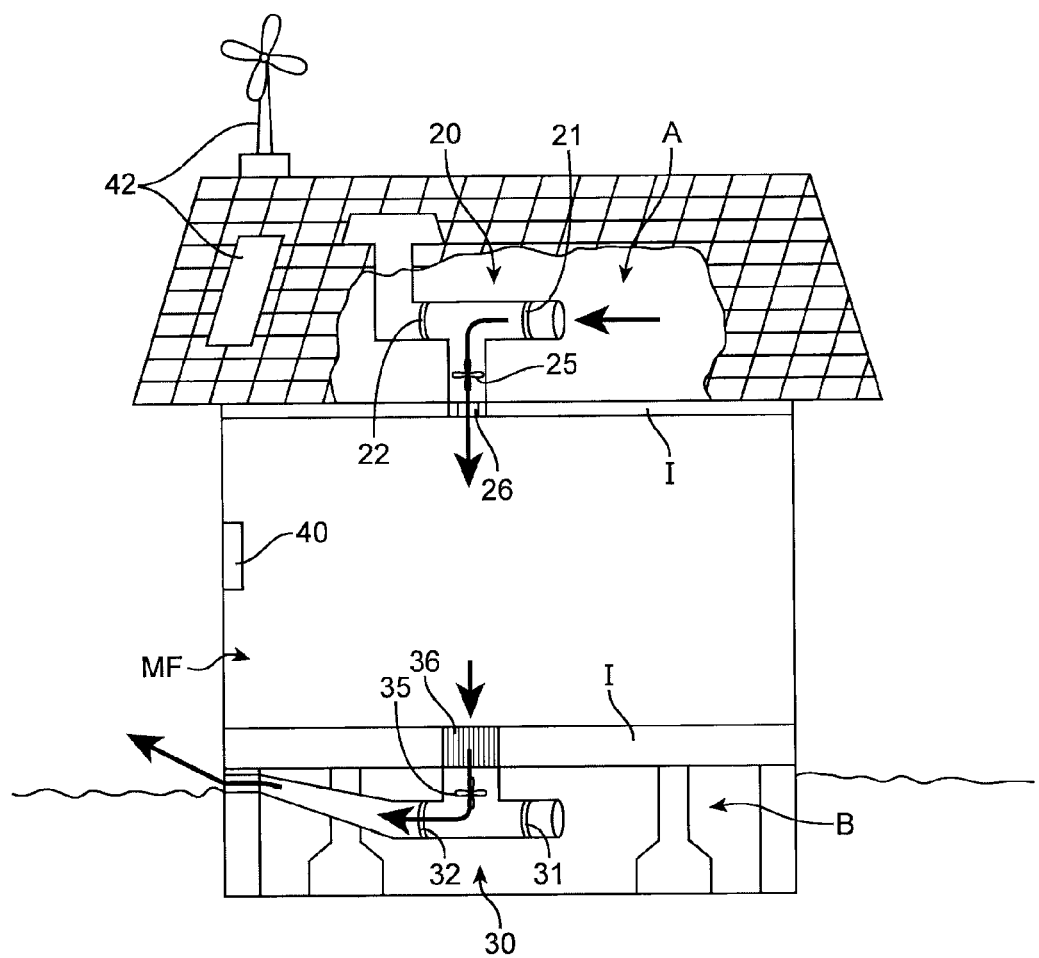
FIG. 2 is a schematic of the main floor of a building being heated in accordance with the present invention.

Referring next to FIG. 2, a system for heating main floor MF is shown. When the control system 40's main floor thermostat has determined that the temperature on the main floor has dropped below a pre-determined level, system 40 will activate fan 25 such that it sucks hotter air out of the attic through one way vent 21 and blows the air down into the main floor through vent/ceiling air grill 26. (One way vent 22 will remain closed to air passage during this time such that no air is pulled into system 20 from the exterior of the building). In addition, control system 40 will also signal fan 35 to operate such that the cool air already in the main floor will be pulled down through vent/floor air grill 36 and be blown out of the building through one way air vent 32. (One way vent 31 will remain closed at this time such that no air is vented from the main floor directly into the crawl space). The passage of air flow is shown schematically by the large arrows in FIG. 2.

Figure 3:
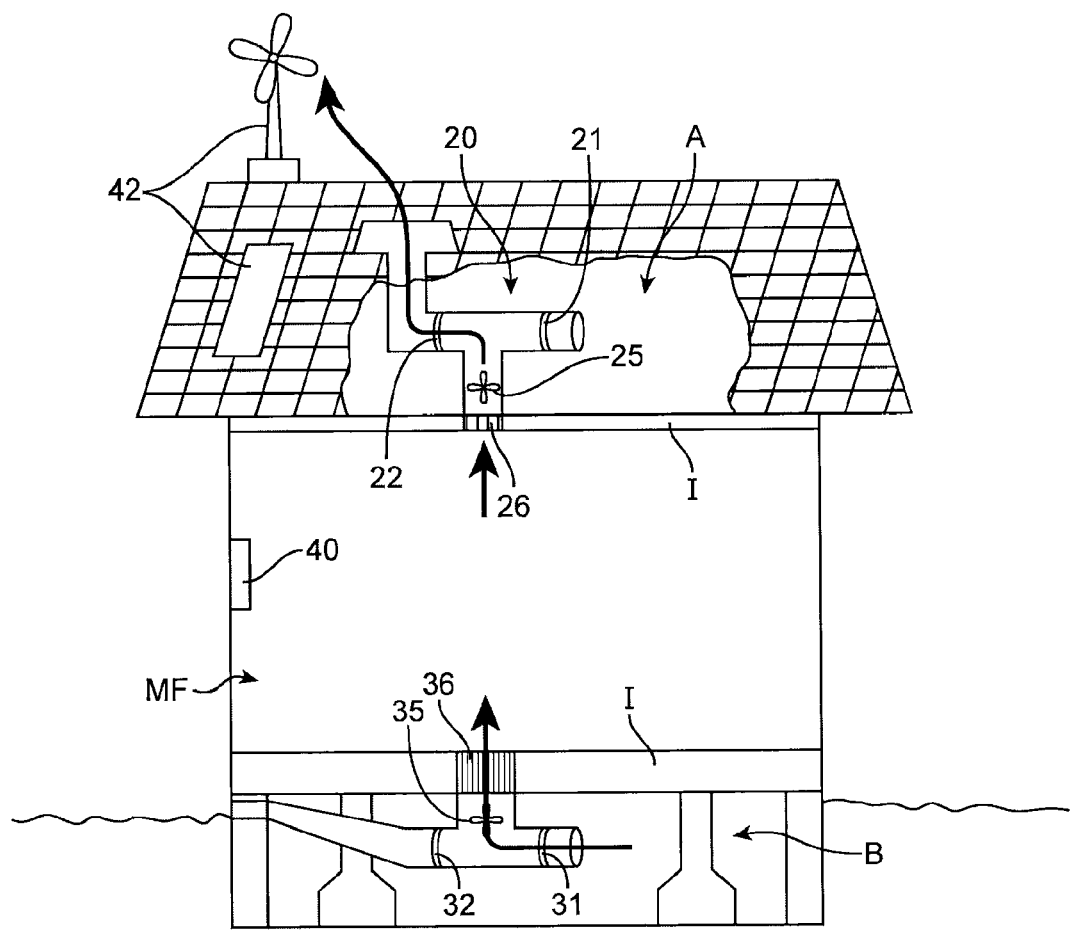
FIG. 3 is a schematic of the main floor of a building being cooled in accordance with the present invention.

Conversely, as seen in FIG. 3, a system for cooling main floor MF is shown. When the control system 40's main floor thermostat has determined that the temperature on the main floor has increased above a pre-determined level, system 40 will activate fan 35 such that it sucks cooler air out of the crawl space through one way vent 31 and blows the air up into the main floor through vent/floor air grill 36. (One way vent 32 will remain closed to air passage during this time such that no air is pulled into system 30 from the exterior of the building). In addition, control system 40 will also signal fan 25 to operate such that the hot air already in the main floor will be pulled up through vent/ceiling air grill 26 and be blown out of the building through one way air vent 22. (One way vent 21 will remain closed at this time such that no air is vented from the main floor directly into the attic). The passage of air flow is shown schematically by the large arrows in FIG. 3.

Hot air rises and the attic A of a building will have a higher temperature than the main floor MF. Similarly, the main floor MF will have a higher temperature than the crawl space B. As can be seen viewing FIGS. 2 and 3, the present invention provides a system that either uses the hotter air in the attic to warm the main floor, or uses the cooler air in the crawl space to cool the main floor.

Figure 4:
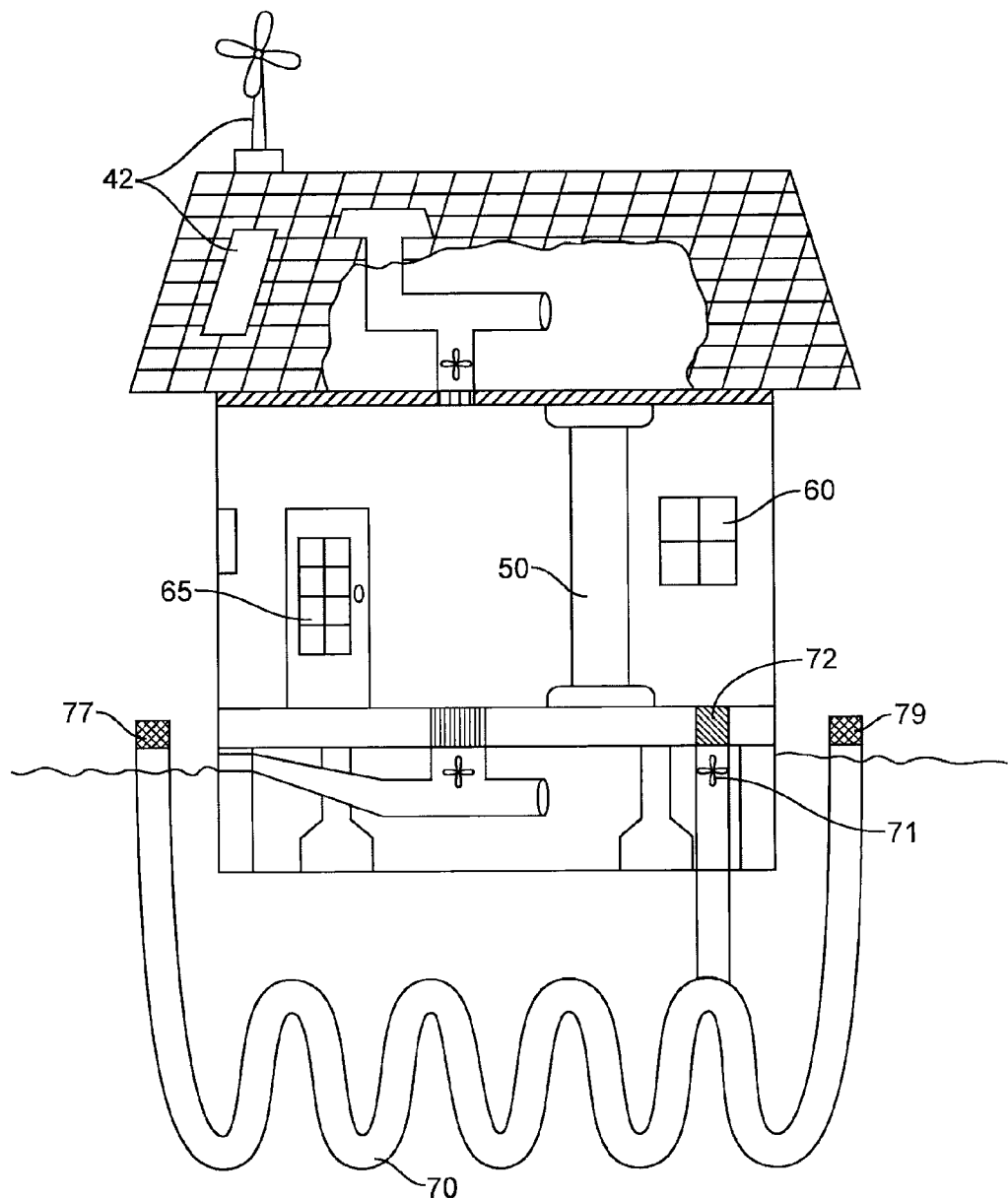
FIG. 4 is a schematic illustration of the building showing various heat absorption and storage systems.

Referring next to FIG. 4, additional optional features of the present invention are described. For example, system 20 may further comprise a heat absorption system that may (or may not) be located on the main floor of the building. For example, the heat absorption system may simply comprise a water storage tank 50. Water is slower to heat than air, and slower to cool than air. Consequently, having a large water storage tank 50 on the main floor will server to add a time delay to the building's heating and cooling. Thus, the temperature on the main floor will remain cooler for a while longer when the sun rises and the air temperature around the building increases. Conversely, after the sun sets and the air temperature around the building drops, the heated water in tank 50 will keep the main floor warm for a while longer. Thus, the presence of water storage tank 50 will tend to moderate the temperature extremes in the main floor, thus reducing the energy required to both heat and cool the building.

A similar heat absorption system may also comprise making the walls of the building out of a mud and straw structure or composite. Optionally as well, the building may have windows 60 to further insulate it (or doors 65), to reduce the energy required to both heat and cool the building. Optionally, windows 60 and doors 65 can be triple or double pane and can contain water or gas or any other fluid between any two layers of the glass. The use of water in the windows can assist in creating the temperature time delay effect as described above with respect to water storage tank 50.

In further optional embodiments, an underground piping system 70 can be included. In accordance with this system, the air within pipe 70 can be hotter than the ambient outside air temperature during the night and cooler than the ambient outside air temperature during the day. (This is due to the fact that the ground is slower to heat and to cool than the ambient air). As a result, the air in pipe 70 can be pumped up into the main floor MF of the house (by fan 71 through floor vent 72) to both cool the main floor of the house during the day or heat the main floor of the house during the night. Specifically, ends 77 and 79 of pipe 70 can be positioned above ground and have a grill or vent covering them. Thus, when fan 71 is activated (pulling air out of pipe 70), fresh air can enter the ends 77 and 79 of pipe 70 and be pulled underground. It is to be understood, however, that only one end (77 or 79) is required to be above ground. Thus, the present application covers embodiments with one or more air entrances into pipe 70.

Figure 5:
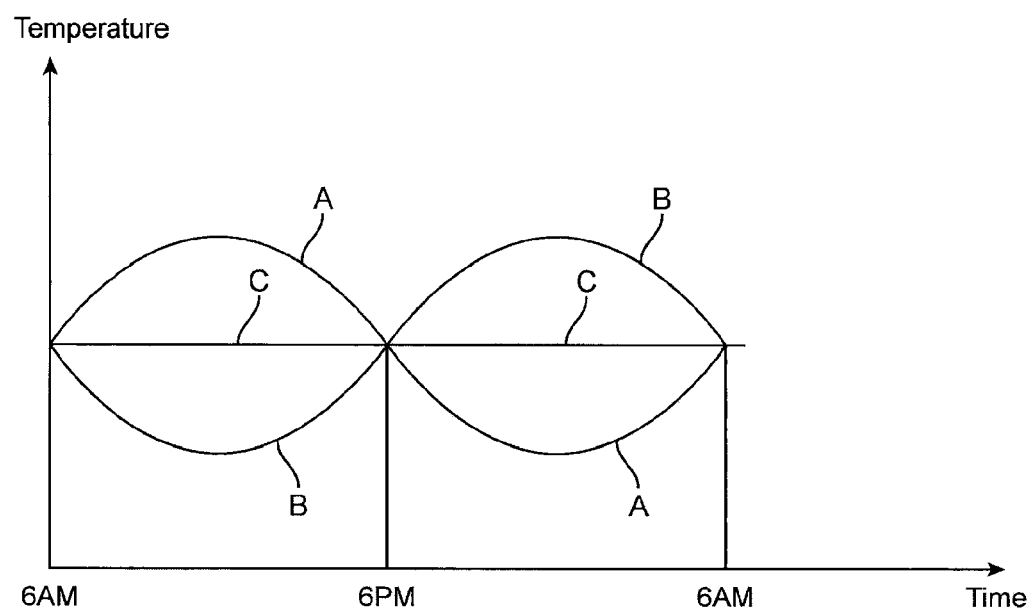
FIG. 5 is a time vs. temperature plot showing the beneficial effects of a time-delay heat absorption and heat loss system.

FIG. 5 illustrates the beneficial effects of a time delay in heating and cooling, as follows. First, a standard house (not using the present invention) is represented by curve "A". Specifically, the house will tend to heat to its warmest temperature in the middle of the day, and cool to its coldest temperature in the middle of the night. As explained above, the present invention represents a variety of different systems that are represented by curve "B". Specifically, the present system can be used to blow cool crawl space air into the main floor during the middle of the day or to blow heated attic air into the main floor during the night (as was explained above and illustrated in FIGS. 2 and 3). The combination of the normal ambient heating of the house (curve A) and the blower systems (curve B) will result is a combined steady state temperature in the main floor (represented by curve C). In addition, FIG. 5 also represents the time delay effect of the optional heat absorption systems as illustrated in FIG. 4. Specifically, curve B also represents the temperature in any of the water tank 50, the water or gas or fluid in windows/doors 60 and 65, and the underground air in pipe 70. Each of these heat absorption systems will be slow to heat (during the day), and slow to cool (during the night. This is because the heat absorption system absorb heat during the daytime and release heat during the night time. The time-delay effect of these heat absorption systems (represented by curve B), will also result in the combined steady state temperature of curve C.

What is claimed is:

1. A system for heating and cooling a main floor of a building, comprising:
    a building having an attic, a main floor and a crawl space;
    an attic air blower system for moving attic air into the main floor; and
    a crawl space air blower system for moving crawl space air to the main floor; and
    a control system for simultaneously operating the attic air blower system and crawl space air blower system, such that the attic air blower system and the crawl space air blower system operated simultaneously such that:
        (i) the attic air blower system moves air from the attic into the main floor at the same time that the crawl space air blower system moves air from the main floor through the crawl space to the exterior of the building; or
        (ii) the attic air blower system moves air from the main floor through the attic to the exterior of the building at the same time that the crawl space air blower system moves air from the crawl space into the main floor; and
    wherein the attic air blower system comprises a pair of one-way air vents in the attic, comprising:
        (i) a one-way air vent to pass air from the attic into the main floor, and
        (ii) a one-way air vent to pass air from the main floor to the exterior of the building; and
    wherein the crawl space air blower system comprises a pair of one-way air vents in the crawl space, comprising:
        (i) a one-way air vent to pass air from the crawl space into the main floor, and
        (ii) a one-way air vent to pass air from the main floor to the exterior of the building.

2. The system of claim 1, wherein the attic air blower system comprises a reversible blower for moving air in either direction between the attic and the main floor.

3. The system of claim 1, wherein the crawl space air blower system comprises a reversible blower for moving air in either direction between the crawl space and the main floor.

4. The system of claim 1, wherein the control system operates the attic and crawl space air blowers such that the attic blower moves air from the main floor through the attic to the exterior of the building at the same time that the crawl space air blower moves air from the crawl space to the main floor.

5. The system of claim 4, wherein the control system activates the attic and crawl space air blowers when the temperature on the main floor is above a pre-determined temperature.

6. The system of claim 1, wherein the control system operates the attic and crawl space air blowers such that the attic blower moves air from the attic to the main at the same time that the crawl space air blower moves air from the main floor through the crawl space to the exterior of the building.

7. The system of claim 6, wherein the control system activates the attic and crawl space air blowers when the temperature on the main floor is below a pre-determined temperature.

8. The system of claim 1, further comprising:
    a heat absorption system on the main floor of the building.

9. The system of claim 8, wherein the heat absorption system comprises:
    a water storage tank.

10. The system of claim 1, wherein the building has walls made of a mud and straw composite.

11. The system of claim 1, further comprising:
at least one solar panel or wind turbine for powering the attic and crawl space air blower systems.

12. The system of claim 1, wherein the building has multiple pane windows.

13. The system of claim 1, further comprising:
underground air piping having at least one end open to ambient air; and
a blower for drawing air from the underground air piping into the main floor of the building.

* * * * *